(12) United States Patent
Polli et al.

(10) Patent No.: US 11,181,423 B2
(45) Date of Patent: Nov. 23, 2021

(54) BIREFRINGENT INTERFEROMETER FOR MEASURING PHOTOLUMINESCENCE PROPERTIES OF SAMPLES

(71) Applicant: Politecnico di Milano, Milan (IT)

(72) Inventors: Dario Polli, Milan (IT); Giulio Cerullo, Milan (IT); Fabrizio Preda, Milan (IT); Antonio Perri, Milan (IT); Jürgen Hauer, Vienna (AT)

(73) Assignee: Politecnico di Milano, Milan (IT)

( * ) Notice: Subject to any disclaimer, the term of this patent is extended or adjusted under 35 U.S.C. 154(b) by 0 days.

(21) Appl. No.: 16/605,032

(22) PCT Filed: Mar. 19, 2018

(86) PCT No.: PCT/IB2018/051816
§ 371 (c)(1),
(2) Date: Oct. 14, 2019

(87) PCT Pub. No.: WO2018/185583
PCT Pub. Date: Oct. 11, 2018

(65) Prior Publication Data
US 2021/0123808 A1    Apr. 29, 2021

(30) Foreign Application Priority Data

Apr. 7, 2017    (IT) .................. 102017000038903

(51) Int. Cl.
*G01J 3/45*    (2006.01)
*G01J 3/02*    (2006.01)
(Continued)

(52) U.S. Cl.
CPC .............. *G01J 3/45* (2013.01); *G01J 3/0205* (2013.01); *G01J 3/0224* (2013.01);
(Continued)

(58) Field of Classification Search
CPC ...... G01J 3/0205; G01J 3/0224; G01J 3/0237; G01J 3/45; G01J 3/2823; G01J 3/0208; G02B 5/3083
See application file for complete search history.

(56) References Cited

U.S. PATENT DOCUMENTS

| 2006/0203238 A1* | 9/2006 | Gardner, Jr. .......... G01N 21/65 356/301 |
| 2012/0016917 A1* | 1/2012 | Priddle ................ H04N 21/433 707/827 |
| 2014/0185052 A1* | 7/2014 | Chen ..................... G01J 3/0237 356/453 |

FOREIGN PATENT DOCUMENTS

WO    2010112679 A1    10/2010

OTHER PUBLICATIONS

International Search Report dated Jun. 12, 2018; 3 pages.

* cited by examiner

*Primary Examiner* — Dominic J Bologna
(74) *Attorney, Agent, or Firm* — Mark Malek; Widerman Malek, PL

(57) ABSTRACT

A measurement system of photoluminescence properties of a sample, comprises a radiation source module configured to generate a first radiation, an excitation optical path coupled to the radiation source module, a support structured to support a sample to be optically coupled to excitation optical path and adapted to provide a photoluminescence radiation, and collection path coupled to the sample and configured to propagate the photoluminescence radiation. The system also includes an analysis device configured to receive the photoluminescence radiation and provide data/information on photoluminescence properties of sample. At least one path between the excitation path and the collection path comprises a respective adjustable birefringent common-path (Continued)

interferometer module configured to produce first and second radiations adapted to interfere with each other.

10 Claims, 5 Drawing Sheets

(51) Int. Cl.
  *G01J 3/28* (2006.01)
  *G02B 5/30* (2006.01)
(52) U.S. Cl.
  CPC .......... *G01J 3/2823* (2013.01); *G02B 5/3083* (2013.01); *G01J 3/0208* (2013.01); *G01J 3/0237* (2013.01)

BIREFRINGENT INTERFEROMETER FOR MEASURING PHOTOLUMINESCENCE PROPERTIES OF SAMPLES

STATEMENT OF FEDERAL FUNDING

The project leading to this patent application has received funding from the European Research Council (ERC) under the European Union's Horizon 2020 research and innovation program (grant agreements No 648615 and 754802).

TECHNICAL FIELD

The present invention relates to techniques for measuring photoluminescence properties of samples.

DESCRIPTION OF THE RELATED ART

Photoluminescence is the spontaneous emission of light from a material following optical excitation. Photoluminescence includes, as an example, fluorescence and phosphorescence.

For phosphorescence, the absorbed photons excite electrons from the ground state to an excited state. After the excitation, these electrons undergo intersystem crossing where they enter a state with altered spin multiplicity, usually a triplet state. Once energy from this absorbed photon is partially transferred in this triplet state, the electronic transitions back to the lower singlet energy states are quantum-mechanically forbidden, meaning that it is much less probable than other allowed transitions. The result is a slow emissive process back to the singlet ground state, which may last minutes or hours.

Fluorescence is the property of molecules to emit electromagnetic radiation by a quantum-mechanically allowed transition from the excited states to the ground state. With respect to phosphorescence, this transition happens with higher probability, thus resulting in a faster radiative emission. For simplicity reasons, here and after we will refer only to fluorescence. However, fluorescence and phosphorescence can be interchanged, since all the following considerations are valid also for phosphorescence.

Fluorescence has been widely used in the last decades as a powerful tool to study and to identify different chemical species. In fact, two different molecules, both excited with the same radiation, become distinguishable because of the differences in their fluorescence spectra. A variant of this technique is called fluorescence excitation: in this case, the two molecules are excited with light at different wavelengths (either with polychromatic light or by sequentially selecting different wavelengths, usually via a monochromator) and the fluorescence intensity is recorded on a single-pixel detector, usually at a single emission wavelength, as a function of excitation wavelength. This signal, called fluorescence excitation spectrum, can be used as an alternative and more decisive method to discriminate among different chemical species. However, if the emission (excitation) spectra of two different molecules are the same, fluorescence emission (excitation) fails to distinguish the two chemical species.

Excitation Emission Matrix (EEM) maps are a powerful tool combining emission and excitation fluorescence techniques to take advantage of their complementarity, thus boosting the ability to identify different chemical species. Moreover, EEM maps enable the study of interaction (as an example, energy transfer) among different species in a mixture.

Document "Fourier transform two-dimensional fluorescence excitation spectrometer by using tandem Fabry-Perot interferometer," H. Anzai, N. K. Joshi, M. Fuyuki, and A. Wada Rev. Sci. Instrum. 86(1), 014101 (2015), describes an interferometric technique to measure two-dimensional EEM maps based on a Fourier transform approach. The working principle of the setup disclosed in that document is the following: one Fabry-Perot interferometer is kept fixed, while the other one is made to vary its cavity length, thus generating a variable beating in the incoming light. This allows modulating spectrally the excitation light, but with the following drawbacks:

a. the presence of spurious high-frequency spectral fringes spoils the desired signal;
b. the limitation in the variation of the cavity length of the tunable Fabry-Perot interferometer limits the spectral resolution, making this technique unsuitable for analysing congested fluorescence spectra;
c. the use of a series of two Fabry-Perot interferometers significantly decreases the light throughput that is an essential property of any spectrometer.

Another optical measurement system employing a Fabry-Perot interferometer is the one described in document WO2010/112679. According to this document, the illuminating light beam and/or measurement light beam is led through a Fabry-Perot interferometer and the Fabry-Perot interferometer is controlled into different modes during the measurement of a single target.

Document "Interferometric measurement of fluorescence excitation spectra", J. G. Hirschberg, G. Vereb, C. K. Meyer, A. K. Kirsch, E. Kohen, and T. M. Jovin, Appl. Opt. 37(10), 1953-1957 (1998), describes an interferometric measurement of fluorescence excitation spectra using a common Michelson interferometer that causes an intrinsic stability problem due to, for example, mechanical vibrations. For this reason, the device described in that document needs a precise control and reproducibility of the mirror movement. Moreover, this known system cannot acquire a complete two-dimensional EEM, but only single cuts of it (corresponding to specific detection wavelengths) as a function of the excitation wavelengths, by changing manually the detection filter in front of the detector.

Document "Fourier transform emission lifetime spectrometer", L. Peng, J. T. Motz, R. W. Redmond, B. E. Bouma, and G. J. Tearney, Opt. Lett. 32, 421-423 (2007), describes the working principle of a Fourier transform spectrometer that employs a path length modulated Michelson interferometer to simultaneously measure excitation spectra and excitation wavelength-dependent emission lifetimes. The described system requires a control on the positioning of the moving mirror of the Michelson interferometer to compensate for mechanical vibrations. A tracking beam (He—Ne) is used that "measures the mirror M2 movement from a separate Michelson interferometer, whose translating mirror is a small reflector attached to the back of the moving mirror M2".

Document US-A-2006/203238 relates to a portable system for obtaining a spatially accurate wavelength-resolved image of a sample having a first and a second spatial dimension that can be used for the detection of hazardous agents by irradiating a sample with light, forming an image of all or part of the sample using Raman shifted light from the sample, and analyzing the Raman shifted light for patterns characteristic of one or more hazardous agents. The Applicant observes that this document refers to Raman imaging systems and does not relate to techniques for measuring photoluminescence properties of samples. Furthermore, this document describes the use of a tunable bandpass filter, working in the frequency domain and using the combination of birefringent plates and polarizers, also known as the Lyot filter, to select a specific portion of the spectrum of the light.

Document US-A-2014/0185052 describes a high sensitive Fourier-transform spectrometer with fixed birefringent wedge and a moving birefrigent wedge. The Applicant observes that according to US-A-2014/0185052 the light spectrum is not measured sequentially in the frequency domain by tuning a bandpass filter but rather in the time domain by recording an interferogram. This document refers to the following low light applications: Raman spectroscopy, flow-cytometry, multi-track Raman spectroscopy, pump-probe spectroscopy, and multi-object fiber spectroscopy in astronomy.

BRIEF SUMMARY OF THE INVENTION

The Applicant has noticed that the known techniques for performing measurements of fluorescence (excitation) spectra show limitations in resolution, stability and light throughput.

The Applicant has noticed that using an interferometer having a common-path geometry allows obtaining high stability on the relative delay between generated replicas (also in the ultraviolet spectral region) and accuracy (on the order of attoseconds) with no need of active control.

The present invention relates to a measurement system of photoluminescence properties of a sample as defined by the appended claim 1. Particular embodiments of the system are described by the dependent claims 2-10.

BRIEF DESCRIPTION OF THE DRAWINGS

Further characteristics and advantages will be more apparent from the following description of a preferred embodiment and of its alternatives given as an example with reference to the enclosed drawings in which.

DETAILED DESCRIPTION

Figure 1:
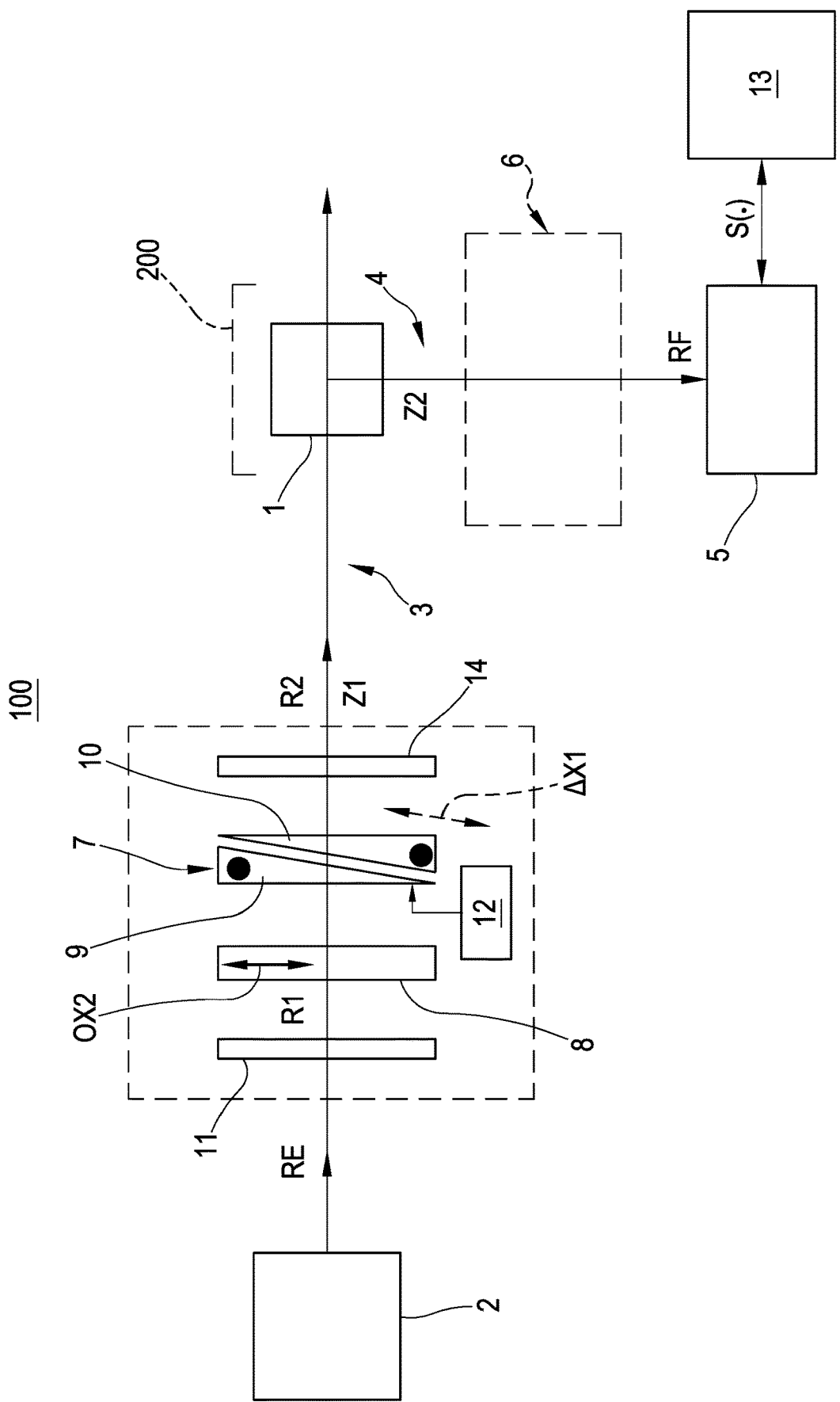
FIG. 1 shows a particular embodiment of a measurement system of photoluminescence properties of a sample and shows an example of a common-path interferometer module.

FIG. 1 shows an embodiment of measurement system 100 adapted to measure photoluminescence properties of samples. Particularly, measurement system 100 can be employed to measure fluorescence or phosphorescence properties of samples. The following description refers to the fluorescence measurements, but the same techniques also apply to phosphorescence properties of samples, as it will be clear to the skilled person.

Sample 1 is suitably mounted on a support or holder 200 (schematically represented in the drawings).

Measurement system 100 can be configured to measure at least one of the following quantities: the Excitation-Emission-Matrix (EEM), fluorescence emission spectra and fluorescence excitation spectra of samples. The above-indicated quantities can be measured over a broad bandwidth in any spectral region, including the UV region, the visible region, the near-infrared region and the infrared regions. The above-indicated quantities can be also measured using phosphorescence instead of fluorescence as a molecular signal. Moreover, measurement system 100 can be employed to measure the absorption spectrum of sample 1, as will be clarified later with reference to the first example.

The sample 1 can be, as an example, a biological and/or pharmaceutical material. In biology and/or pharmaceutics, fluorescence and EEM measurements are performed regularly in order to retrieve crucial information about the sample's chemical composition, such as, for example: rapid identification and quality evaluation of cell culture media components. Such measurements are, in general, useful for sample tracking and quality assessment in biopharmaceutical industries. The EEM measurements can be also used to detect and quantitatively assess dissolved organic matter in water and contaminants of jet fuels with aero-turbine lubricating oil. Measurement system 100 can be employed, as an example, in general industrial quality test. Another important field is food analysis and food quality testing.

Measurement system 100 comprises an electromagnetic radiation source module 2 coupled to an excitation path 3 ending on the sample 1. The electromagnetic radiation source module 2 (called, herein after, source module) is configured to generate a radiation (light) propagating along the excitation path 3.

Measurement system 100 also comprises a collection (or detection) path 4 coupled to sample 1. Excitation path 3 defines a first propagation direction z1 and the collection path 4 defines a second propagation direction z2 which is, preferably, traversal to the first propagation direction z1. According to the example considered, the first propagation direction z1 is perpendicular to the second propagation direction z2.

Collection path 4 is configured to allow propagation of radiation, i.e. fluorescence light emitted from sample 1 as a consequence of excitation with light coming from the excitation path 3.

Source module 2 can be a coherent source (e.g. a laser) or an incoherent source (e.g. a lamp). Source module 2 may generate polychromatic radiation or monochromatic radiation of either linear or other types of polarizations, as will be clarified in subsequent examples.

Measurement system 100 also includes an analysis device 5 coupled to collection path 4 in order to receive radiation propagated along collection path 4 and provide data/information on the fluorescence emitted from sample 1. According to the particular implementation, analysis device 5 may include a spectrometer or a detector.

Measurement system 100 further comprises an adjustable birefringent common-path interferometer module 6 placed along excitation path 3 and/or detection path 4. The adjustable birefringent common-path interferometer module 6 is configured to produce first and second radiations, which are collinear and adapted to interfere with each other.

The adjustable birefringent common-path interferometer module 6 includes at least one movable birefringent optical element 10. The movable birefringent optical element 10 allows varying a time delay between the first and second radiations. A possible implementation of the adjustable birefringent common-path interferometer module 6 is described with reference to the subsequent first example.

Moreover, measurement system 100 may comprise further optical components, such as lenses or objectives, in order to suitably focus or collimate the radiation on sample 1 and on analysis device 5.

Measurement system 100 can also be equipped with a computing and control module 13 connected to the analysis device 5 to perform additional processing of its output signal.

It is noticed that measurement system 100 is an interferometric measurement system and is based on the interference of two replicas (the above-mentioned first and second radiations) of the incoming radiation when a delay T is imposed between the two. The light is modulated, by the birefringent common-path interferometer module 6, differently for each fixed delay and the radiation spectral intensity going out the interferometer module 6 is given by:

$$I(\tau) = |E(\omega) + E(\omega)e^{i\omega\tau}|^2 =$$
$$|E(\omega)|^2 + |E(\omega)|^2 + 2Re(E^*(\omega)E(\omega)e^{i\omega\tau}) == 2I(\omega) + 2I(\omega)\cos\omega\tau$$

a. where $E(\omega)$ and $I(\omega)$ are the electric field and intensity in the angular frequency domain.

This delay-dependent intensity modulation $I(\tau)$ of the light can be employed in the same way either to excite the sample 1 or to extract information about the light emitted from the sample 1. In the first case, knowing the modulation imposed to the excitation light, it is possible to retrieve the fluorescence properties of the sample 1 by analyzing its delay dependent spectral fluorescence intensity as a response to the incoming radiation. In the second case, by looking at the delay dependent light intensity modulation of the light emitted by sample 1, it is possible to extract spectral information about the sample as will be explained afterwards.

Particularly, in operation, source module 2 generates an excitation radiation RE which propagates along the excitation path 3 and reaches the sample 1. Sample 1 may generate fluorescence radiation RF that propagates along collection path 4 and reaches the analysis device 5, which produces an output signal S.

The adjustable birefringent common-path interferometer module 6 (placed along the excitation path 3 and/or along the collection path 4) is adjusted during the measurement procedure by varying position $\Delta x_1$ of the movable birefringent optical element 10, in accordance with a pre-established calibration procedure.

Fluorescence radiation RF that reaches analysis device 5 depends on both the molecular properties of sample 1 (particularly, the emission spectrum) and the interfering radiation components produced by the adjustable birefringent common-path interferometer module 6.

Analysis device 5 produces an output signal S depending on the known positions $\Delta x_1$ of the movable birefringent optical element 10 and on the fluorescence light emitted from sample 1. Further processing of the output signal S (e.g. a Fourier Transform) allows providing additional measured data on the fluorescence behavior of sample 1.

First Example: Interferometer Along the Excitation Path

In a first example, the adjustable birefringent common-path interferometer module 6 (hereinafter called, interferometer module) is provided in excitation path 3 and no interferometer module is provided into collection path 4. According to this example, the source module 2 produces a polychromatic radiation.

Particularly, the interferometer module 6 (FIG. 1) is provided with an adjustable wedge pair 7 and an optical element 8.

The adjustable wedge pair 7 is configured to provide an adjustable time delay between radiation components passing through it and having reciprocally orthogonal polarizations.

The adjustable wedge pair 7 comprises, as an example, a first optical wedge 9 and a second optical wedge 10 (e.g. the above-mentioned movable optical element). Both first 9 and second 10 optical wedges are made of a birefringent material and, as an example, show optical axes OX1 parallel to each other. Particularly, the first optical wedge 9 and the second optical wedge 10 are optical prisms, having, preferably, the same apex angle. The first optical wedge 9 coupled to the second optical wedge 10 is equivalent to an optical plate having variable thickness.

At least one of the two optical wedges 9 and 10 is movable along a direction transversal to the first direction z1 by means of an actuator 12, schematically represented. Particularly, the first optical wedge 9 is fixed and the second optical wedge 10 is movable.

The adjustable time delay introduced by the wedge pair 7 is dependent on the variable position of the second optical wedge 10. Moreover, as an example, the actuator 12 may include a computer-controlled precision translation stage. As an example, the computing and control module 13 controls the actuator 12. Alternatively, the computing and control module 13 reads and suitably stores the position values assumed by the second optical wedge 10 shifted by the actuator 12.

Optical element 8 is a birefringent plate having a respective optical axis OX2 perpendicular to the optical axis of wedge pair 7 and the first direction z1. Optical element 8 is coupled with the adjustable wedge pair 7 and configured to introduce a fixed time delay between the radiations having reciprocally orthogonal polarizations.

Moreover, interferometer module 6 can be equipped with an input polarizer 11 to provide an output radiation of linear polarization transversal to the optical axes OX1 and OX2 and, preferably, having tilt of 45° with respect to such axes. Input polarizer 11 can be avoided in case the source module 2 already produces a suitably polarized radiation.

Interferometer module 6 also includes an output polarizer 14, as an example, interposed between the adjustable wedge pair 7 and sample 1. As the skilled person can recognize, the order of the elements of the interferometer module 6 can be different from the one shown in the drawings.

According to this first example, analysis device 5 is a spectrometer, i.e. a device measuring the intensity of fluorescence radiation RF as a function of its wavelength.

In operation, the excitation radiation RE emitted by source module 2 reaches interferometer module 6, provided along excitation path 3. Input polarizer 11 provides a first radiation R1 of linear polarization, as an example at 45° with respect to the optical axes OX1 and OX2.

The birefringent plate 8 introduces a fixed first delay between the two orthogonally polarized components of the first radiation R1 that propagate along the fast and slow axis of the material of the birefringent plate 8. The adjustable wedge pair 7 introduces a second delay between such orthogonally polarized components. The second delay is of opposite sign with respect to the first delay, allowing one to change from positive to negative values (and vice versa) the resulting relative delay.

The delay introduced by the adjustable wedge pair 7 is varied by changing the position (variation $\Delta x_1$) of the second optical wedge 10. Particularly, actuator 12 varies the position of the second optical wedge 10, preferably, in a controlled and continuous manner, within a position range, defined by a minimum and a maximum value. The position values are suitably stored in a memory in connection with the corresponding delay time.

The second polarizer 14 projects the two delayed components exiting the adjustable wedge pair 7 to a common polarization state (as an example, at 45°), allowing the two radiation components to interfere.

Output radiation R2 exits interferometer module 6 and reaches sample 1. If the spectrum of output radiation R2 has at least a partial overlap with the absorption spectrum of sample 1, then sample 1 absorbs light, thus reaching an excited state. If showing a fluorescence behavior, sample 1 produces fluorescence radiation RF. Fluorescence radiation RF is collimated and focused on spectrometer 5, which measures a fluorescence signal $S(\Delta x_1, \lambda_2)$.

Fluorescence signal $S(\Delta x_1, \lambda_2)$ is a function of position $\Delta x_1$ of the adjustable wedge pair 7 and detection wavelength $\lambda_2$ of spectrometer 5.

Figure 2:
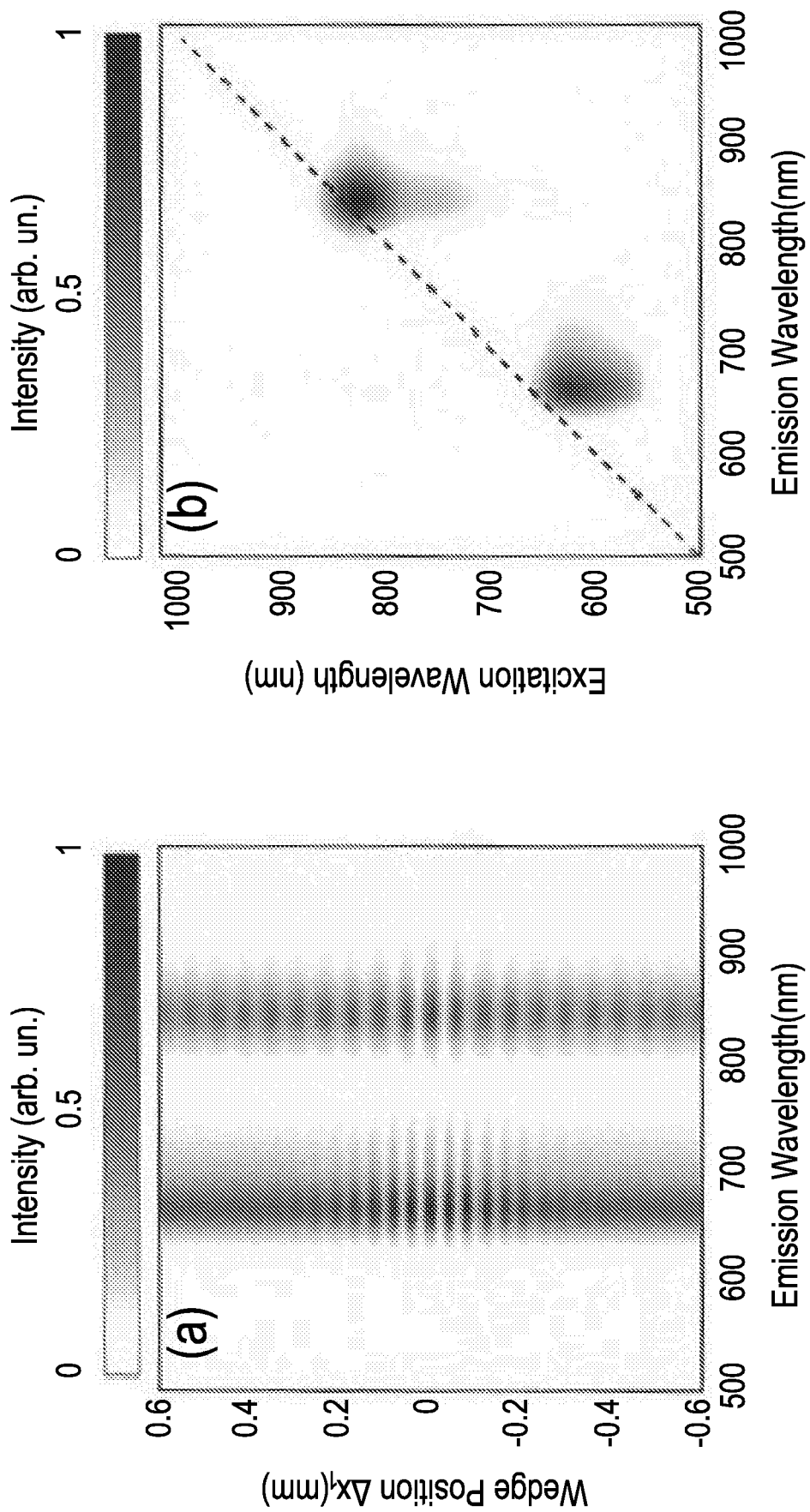
FIG. 2*a* shows an example of a two-dimensional fluorescence map obtainable with said measurement system.
FIG. 2*b* shows an EEM map obtainable with said photoluminescence measurement system.

FIG. 2a shows an example of a two-dimensional fluorescence map corresponding to the fluorescence signal $S(\Delta x_1, \lambda_2)$.

The fluorescence spectrum signal $S(\Delta x_1, \lambda_2)$ is transformed in the wavelength domain ($S(\lambda_1, \lambda_2)$) through a Fourier transformation (FT) procedure, performed (as an example) by the computing and control module 13, leading to:

$$S(\lambda_1, \lambda_2) = FT\{S(\Delta x_1, \lambda_2)\}(\lambda_1, \lambda_2) \quad (1)$$

$$S(\lambda_1, \lambda_2) = \int S(\Delta x_1, \lambda_2) e^{\frac{i 2\pi \Delta x_1}{\lambda_1}} d(\Delta x_1) \quad (2)$$

The signal after Fourier transform $S(\lambda_1, \lambda_2)$ is the so-called EEM map containing information about the fluorescence properties with respect to the excitation wavelength $\lambda_1$ and detection wavelength $\lambda_2$, wherein:

$\lambda_1$ is the excitation wavelength, i.e. the wavelength of the radiation generated by source module 2 causing the fluorescence phenomena;

$\lambda_2$ is the emission wavelength, i.e. the wavelength of the fluorescence radiation generated by sample 1 and detected by spectrometer 5.

An example of the EEM map $S(\lambda_1, \lambda_2)$ is shown in FIG. 2(b).

Second Example: Measurement of the Absorption Spectrum

Figure 3:
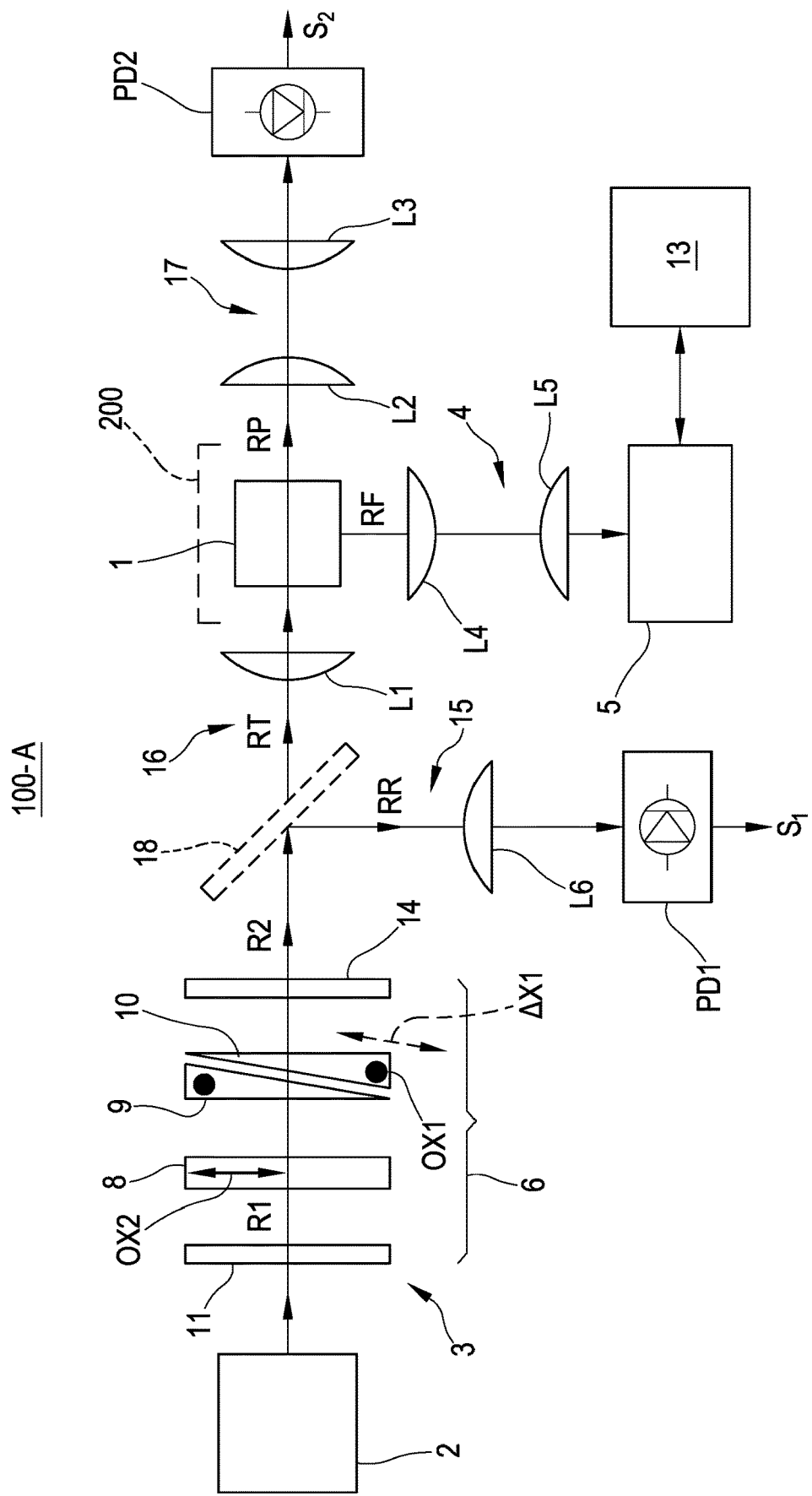
FIG. 3 shows a second example of said photoluminescence measurement system adapted to record also absorption spectra of a sample, in addition to the possibility to measure fluorescence emission and fluorescence excitation spectra.

FIG. 3 refers to a second example 100-A of the measurement system 100, described with reference to FIG. 1. Measurement system 100-A is employed to measure, in addition to the Excitation/Emission Matrix map, also the absorption spectrum of sample 1, by using additional components. Particularly, measurement system 100-A is further provided with a beam splitter 18 placed along excitation path 3, between source module 2 and sample 1. As an example, beam splitter 18 is placed between interferometer module 6 (if provided along the excitation path 3) and sample 1.

Beam splitter 18 is configured to split (accordingly to a known split ratio) an incoming radiation (e.g. the output radiation R2) into a reflected radiation RR propagating along a reflection path 15 and a transmitted radiation RT propagating along the transmission path 16 (collinear with excitation path 3) up to the sample 1.

Reflection path 15 (preferably, perpendicular to excitation path 3) comprises a first detector PD1 (e.g. a photodiode or a photomultiplier) which is configured to convert the incoming reflected radiation RR into a first electrical signal $S_1$.

Holder 200 supporting sample 1 is provided with an input port coupled to transmission path 16 (which partially corresponds to excitation path 3) and an output port for a pass-through radiation RP propagating along pass-through path 17. Pass-through path 17 includes a second detector PD2 (e.g. a photodiode or a photomultiplier) which is configured to convert the incoming reflected radiation RR into a second electrical signal $S_2$.

With reference to the measurement of fluorescence properties of the sample 1, the measurement system 100-A of FIG. 3 operates in a manner analogous to the one above described with reference to FIG. 1.

With regard to the measurement of absorption spectra, it is noted that the electrical signals $S_1$ and $S_2$ provided by the first detector PD1 and the second detector PD2, respectively, are represented by interferograms:

$$S_1 = I_0(\Delta x_1) \quad (2)$$

$$S_2 = I(\Delta x_1) \quad (3)$$

The computing and control module 13 provides the Fourier transformation (FT) of the interferograms $I_0(\Delta x_1)$ and $I(\Delta x_1)$. In particular, the first signal $S_1$ is used as a reference, while the second signal $S_2$ measures the intensity of the pass-through radiation RP, transmitted by sample 1.

The absorption spectrum is calculated (by the computing and control module 13) through the following formula:

$$A(\lambda_1) = \log \frac{FT\{I_0(\Delta x_1)\}(\lambda_1)}{FT\{I(\Delta x_1)\}(\lambda_1)} = \log \frac{I_0(\lambda_1)}{I(\lambda_1)} \quad (4)$$

where the quantity $I_0(\lambda_1)$ is the reference light intensity measured with the first detector PD1 and the quantity $I(\lambda_1)$ is the transmitted light intensity (measured with the second detector PD2).

The example of FIG. 3 also shows collimating and focusing lenses (or objectives) L1-L6 employable in the measurement system 100-A.

Third Example: An Interferometer in the Excitation Path and Another One in the Collection Path FIG. 4 refers to a third example 100-B of measurement system 100 wherein interferometer module 6 is provided along excitation path 3 and further interferometer module 6 (similar or identical to the previous one) is provided along collection path 4. According to this example, source module 2 produces a polychromatic radiation.

The additional interferometer module 6 of collection path 4 is provided with a corresponding second optical wedge 10, which is movable, i.e. its position $\Delta x_2$ can be varied.

Figure 4:
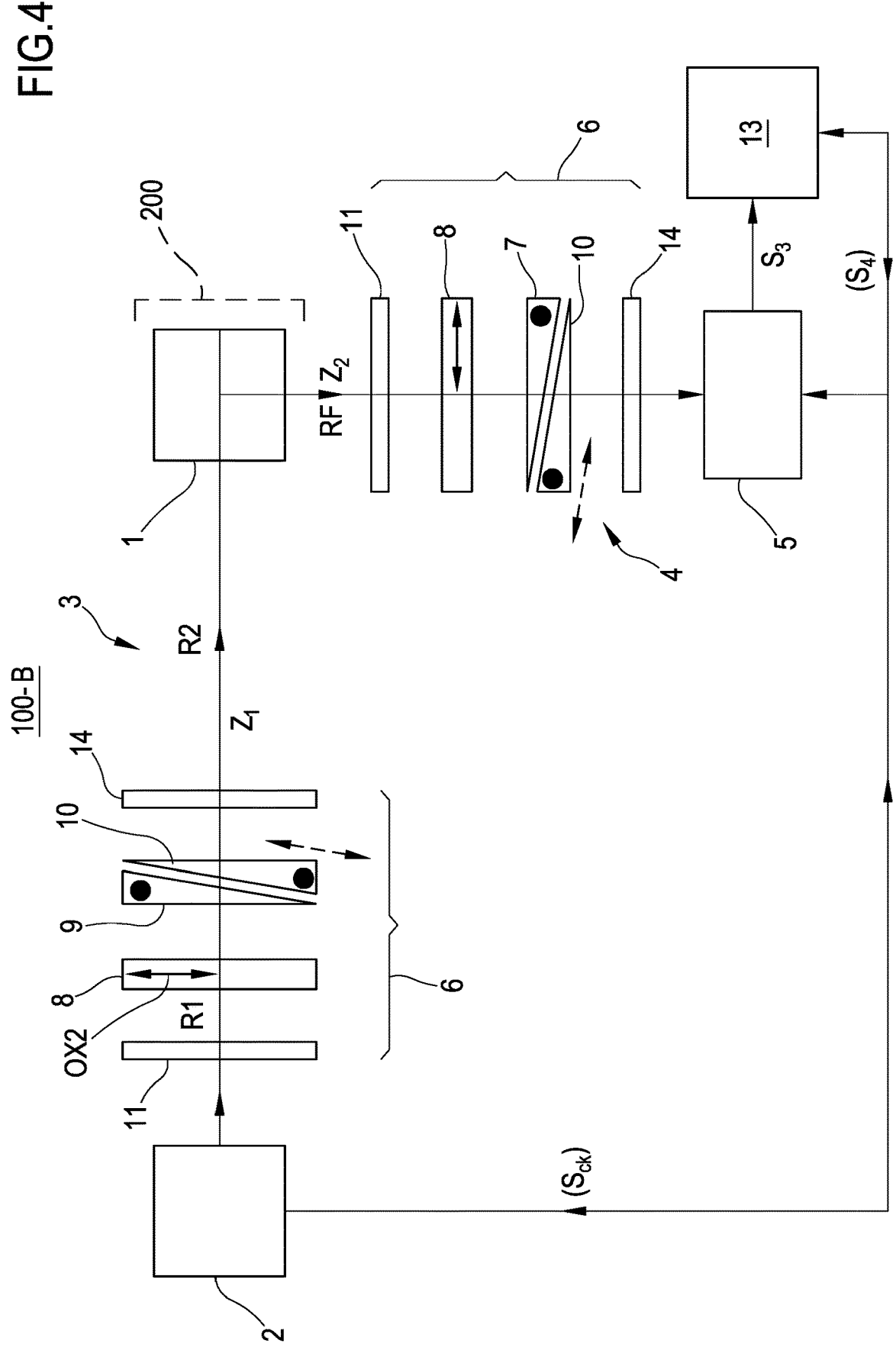
FIG. 4 shows a third example of said photoluminescence measurement system having an interferometer module in both the excitation and the detection paths.

The measurement system 100-B of FIG. 4 comprises as analysis device 5 a detector, which is single-detector-based. Particularly, the detector 5 of FIG. 4 is a single-element device having a single continuous detection surface that is illuminated by the polychromatic radiation exiting the additional interferometer module 6.

Detector 5 is configured to convert the fluorescent radiation RF, which is passed through the additional interferometer module 6, into an electric signal $S_3$.

In operation, both second optical wedges 10 of both interferometer modules 6 are moved to vary the positions $\Delta x_1$ and $\Delta x_2$. The electrical signal $S_3$ provided by detector 5 is a function of the positions $\Delta x_1$ and $\Delta x_2$.

The computing and control module 13 transforms the electrical signal $S_3$ into the wavelength domain by means of a double Fourier transformation as follows:

$$S_3(\lambda_1, \lambda_2) = FT\{FT[S_3(\Delta x_1, \Delta x_2)](\lambda_1, \Delta x_2)\}(\lambda_1, \lambda_2) \quad (5)$$

$$S_3(\lambda_1, \lambda_2) = \int \left[ \int S_3(\Delta x_1, \Delta x_2) e^{\frac{i2\pi \Delta x_1}{\lambda_1}} d(\Delta x_1) \right] e^{\frac{i2\pi \Delta x_2}{\lambda_2}} d(\Delta x_2), \quad (6)$$

where:
a. $\lambda_1$ is the excitation wavelength, i.e. the wavelength of the radiation generated by source module 2 causing the fluorescence phenomena.
b. $\lambda_2$ is the emission wavelength, i.e. the wavelength of the fluorescence radiation generated by sample 1.

The quantity $S(\lambda_1, \lambda_2)$ is the fluorescence Excitation-Emission-Matrix (EEM).

The measurement system 100-B of FIG. 4 also allows measuring fluorescence emission and fluorescence excitation spectra. The former (fluorescence emission) is obtained by integrating the EEM along the excitation wavelength axis, while the latter (fluorescence excitation) is obtained by integrating the EEM along the emission wavelength axis.

Providing the measurement system 100-B of FIG. 4 with the additional components described with reference to FIG. 3, it is also possible to measure the absorption spectrum of sample 1.

It is noticed that the additional interferometer module 6, included into the collection path 4, allows increasing the sensitivity of the measurement system 100-B, taking advantage of the so-called Jacquinot's and Fellgett's advantages, thanks to the absence of an entrance slit followed by a multichannel detector as necessary for spectrometer 5 of the example of FIG. 1. Moreover, the interferometer module 6 can be calibrated in frequency with high precision using well-known spectral features, as an example a Helium-Neon laser (Connes' advantage).

Moreover, the configuration of FIG. 4 can be of great advantage in the infrared spectral region where cheap multichannel detectors are not available.

It is also noticed that the measurement system 100-B of FIG. 4 can be of great interest in areas where sensitivity is the key factor such us in single-molecule spectroscopy or in water contaminant detection.

According to a particular embodiment, the measurement system 100-B of the third example can be used to measure not only EEM and absorption, but also radiative lifetimes of sample 1. According to this embodiment, detector 5 is a time correlated single photon counting (TCSPC) device (or similar time-resolved detector) synchronized with source module 2, by a synchronization signal SCK. Moreover, source module 2 can be a pulsed light source.

This information relating to the radiative lifetime of sample 1 can be helpful to disentangle the different contributions to the fluorescence signals of chemical species that can have the same EEM and absorption features but different lifetimes.

In accordance with this particular embodiment, detector 5 provides a measured signal $S_4(\Delta x_1, \Delta x_2, t)$, where t is the time. Thus, for each position, $\Delta x_1$ and $\Delta x_2$, of the two second optical wedges 10, fluorescence dynamics are recorded as a function of t. A double Fourier transform with respect to $\Delta x_1$ and $\Delta x_2$ (performed by the computing and control module 13) provides a series of EEM maps for different times t:

$$S_4(\lambda_1, \lambda_2, t) = FT\{FT[S_4(\Delta x_1, \Delta x_2, t)](\lambda_1, \Delta x_2)\}(\lambda_1, \lambda_2) \quad (7)$$

$$S_4(\lambda_1, \lambda_2, t) = \int \left[ \int S_4(\Delta x_1, \Delta x_2, t) e^{\frac{i2\pi \Delta x_1}{\lambda_1}} d(\Delta x_1) \right] e^{\frac{i2\pi \Delta x_2}{\lambda_2}} d(\Delta x_2) \quad (8)$$

The wavelengths $\lambda_1$ and $\lambda_2$ have been defined above.

Fourth Example: Interferometer Along the Collection Path

Figure 5:
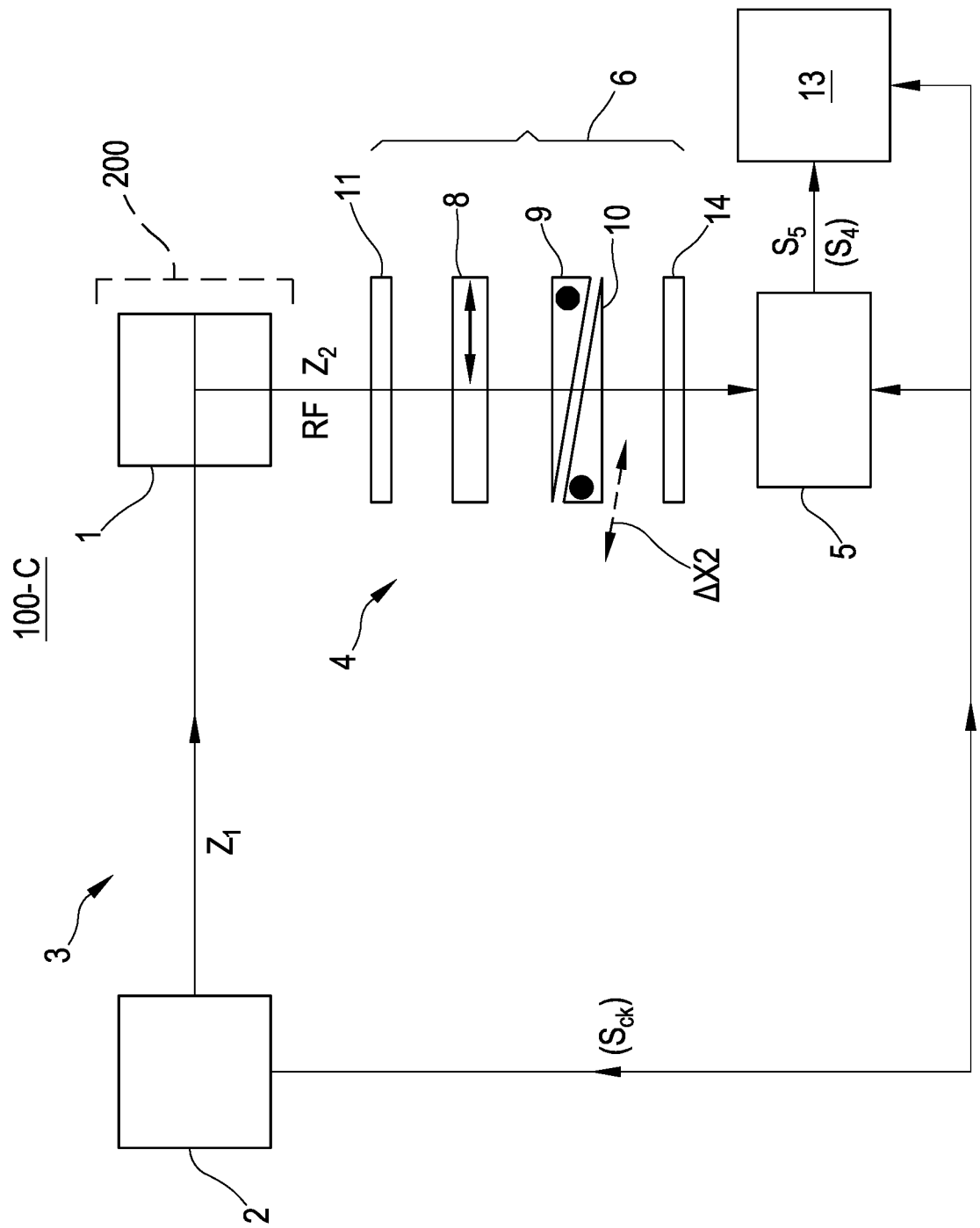
FIG. 5 shows a fourth example of said photoluminescence measurement system having an interferometer module in the collection path.

FIG. 5 shows a fourth example 100-C of the measurement system 100, wherein interferometer module 6 is provided along collection path 4 and no interferometer module is provided along excitation path 3.

In accordance with the fourth example, source module 2 can be a monochromatic source (or a series of different monochromatic sources) or a polychromatic source, followed by a tunable monochromator, that sequentially selects different narrowband excitation wavelengths provided by the broadband polychromatic source.

Depending on the different wavelengths provided by source module 2 it is possible to access one or more horizontal lines (corresponding to different excitation wavelengths) of the EEM map. For each excitation wavelength $\lambda_1$, the second moving wedge 10 of interferometer module 6 (FIG. 5) is scanned so as to obtain the signal $S_5(\Delta x_2)$ as an output of the detector 5. The computing and control module 13 computes the Fourier transformation of signal $S_5(\Delta x_2)$ as a function of $\Delta x_2$ and provides signal $S_5(\lambda_2)$ at a fixed excitation wavelength $\lambda_1$, corresponding to a horizontal line of the EEM map:

$$S_5(\lambda_2) = FT\{S_5(\Delta x_2)\}(\lambda_2) = \int S_5(\Delta x_2) e^{\frac{i2\pi \Delta x_2}{\lambda_2}} d(\Delta x_2) \quad (9)$$

If the source module 2 can provide different excitation wavelengths, by repeating the procedure for different wavelengths $\lambda_1$ it is possible to stack the different lines and retrieve the entire (or a part of the) EEM map. This configuration presents the same advantages as the third example considering the detection stage.

Measurement system 100-C of FIG. 5 can be adapted to determine the radiative lifetime of molecules in sample 1 in a manner analogous to the one described with reference to FIG. 4 (third example). Moreover, the measurement system 100-C of FIG. 5 allows measuring absorption spectra as depicted with reference to FIG. 3.

The described measurement system 100 and the corresponding examples allow overcoming the stability problems shown by the techniques of the prior art. This is also due to the common-path geometry of interferometer module 6, that ensures high stability (also in the ultraviolet spectral region) and accuracy (on the order of attoseconds) on the relative delay between the generated replicas with no need of active control. Moreover, the design of the described measurement system 100 is compact and robust, thus allowing a remarkable reduction of the footprint of the entire instrument.

The invention claimed is:

1. A measurement system of photoluminescence properties of a sample, comprising:
   a radiation source module configured to generate a first radiation;
   an excitation optical path coupled to the radiation source module;
   a support structured to support the sample to be optically coupled to the excitation optical path and adapted to provide a photoluminescence radiation;
   a collection path coupled to the sample and configured to propagate said photoluminescence radiation;
   an analysis device configured to receive the photoluminescence radiation and provide data/information on photoluminescence properties of the sample;
   wherein at least one path between the excitation path and the collection path comprises a respective adjustable birefringent common-path interferometer module configured to produce first and second radiations reciprocally delayed to be adapted to interfere with each other and obtain a delay-dependent intensity modulation.

2. The system of claim 1, wherein said interferometer module comprises:
   an adjustable wedge pair, including an optical wedge and a movable optical wedge, configured to provide an adjustable time delay between radiation components having reciprocally orthogonal polarizations; the adjustable time delay is dependent on a variable position of the movable optical wedge;
   an actuator module (causing translation of the movable optical wedge;
   a birefringent optical element coupled with the adjustable wedge pair and configured to introduce a fixed time delay between radiations of orthogonal polarizations;
   a polarizer device coupled with the adjustable wedge pair and the birefringent component to provide said first and second radiations adapted to interfere with each other, having same linear polarization.

3. The system of claim 1, wherein:
   the system includes a single adjustable birefringent common-path interferometer module placed along the excitation path,
   said analysis device includes a spectrometer providing a first output signal depending on position values associated with a movable component of the single interferometer module and a detection wavelength;
   the system further comprises a computing module configured to perform a Fourier Transformation of the first output signal providing a representation of the photoluminescence of the sample.

4. The system of claim 3, wherein said source module includes a polychromatic optical source.

5. The system of claim 1, wherein:
   the system includes a first adjustable birefringent common-path interferometer module placed along the excitation path;
   the system includes a second adjustable birefringent common-path interferometer module placed along the collection path;
   said analysis device includes a detector configured to provide a second output signal depending on first position values associated with a first movable component of the first interferometer module and second position values associated with a second movable component of the second interferometer module;
   the system further comprises a computing module configured to perform a Fourier Transformation of the second output signal and providing corresponding representation of the photoluminescence properties of sample.

6. The system of claim 5, wherein:
   the optical source includes a pulsed light source;
   the analysis device is a time-resolved detector synchronized with the source module providing an output signal (depending on the radiative lifetime of the molecules in the sample.

7. The system of claim 6, wherein:
   the system includes a single adjustable birefringent common-path interferometer module placed along the collection path;
   said analysis device includes a respective detector configured to provide a third output signal, depending on position values associated with a movable component of the corresponding interferometer module placed along collection path;
   the system further comprises a respective computing module configured to perform a Fourier Transformation of the third output signal to provide a representation of the photoluminescence properties of sample.

8. The system of claim 6, further comprising:
   a beam splitter placed along the excitation path and configured to provide a transmitted radiation to be sent to the sample and a reflected radiation;
   a reference detector configured to receive the reflected radiation and provide a reference signal;
   an output detector configured to receive an output radiation corresponding to said transmitted radiation passed through sample;
   wherein the output detector is configured to provide an absorption signal dependent on the absorption of sample.

9. The system according to claim 6, configured such as that said data/information on photoluminescence properties of sample are at least one of the following: fluorescence Excitation-Emission-Matrix (EEM), fluorescence emission spectrum and fluorescence excitation spectrum, phosphorescence Excitation-Emission-Matrix (EEM), phosphorescence emission spectrum and phosphorescence excitation spectrum.

10. The system according to claim 6, wherein the radiation source module is configured to operate in one of the following spectral regions: the UV region, the visible region, the near-infrared region and the infrared region.

* * * * *